Figure 1:
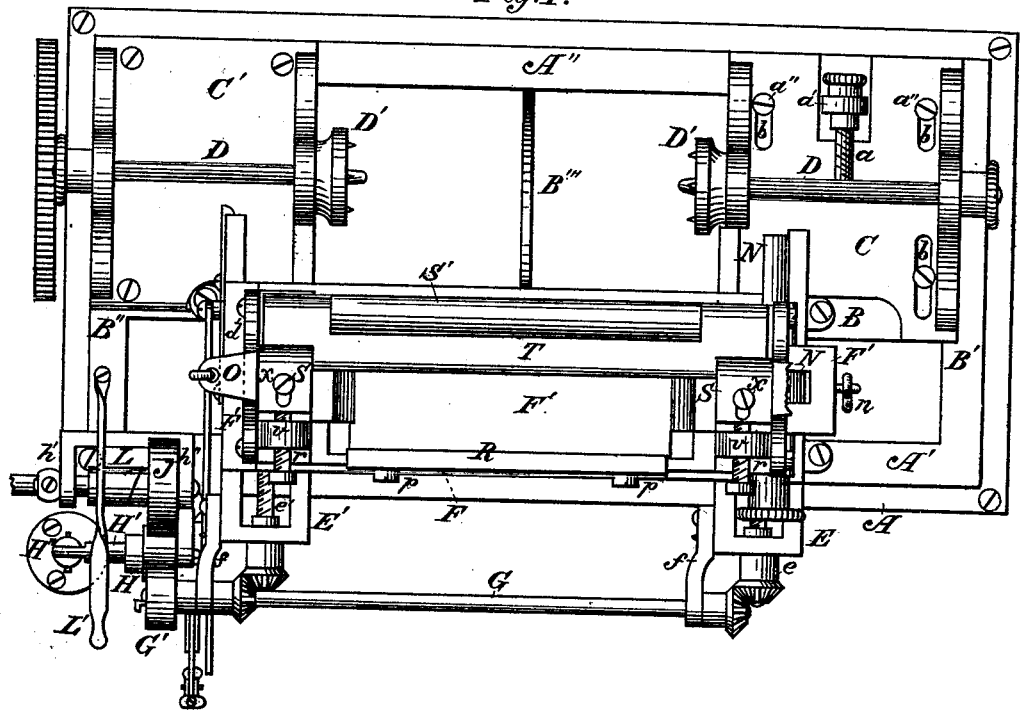

2 Sheets—Sheet 1.

J. D. McEACHREN.
Machine for Cutting Veneers.

No. 198,404. Patented Dec. 18, 1877.

Attest:
F. H. Schott.
W. H. Chandler

Inventor:
John D. McEachren
by J. C. Tasker & Co. atty.

N. PETERS, PHOTO-LITHOGRAPHER, WASHINGTON, D. C.

2 Sheets—Sheet 2.
J. D. McEACHREN.
Machine for Cutting Veneers.
No. 198,404. Patented Dec. 18, 1877.
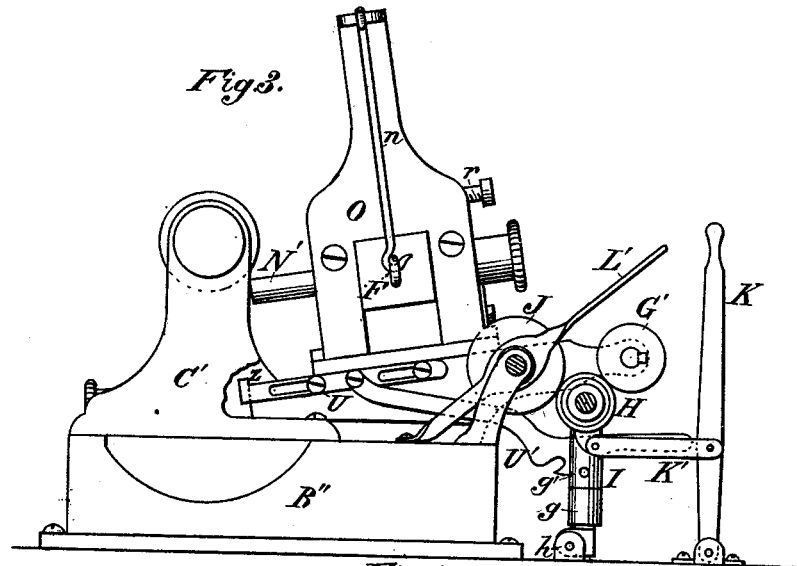
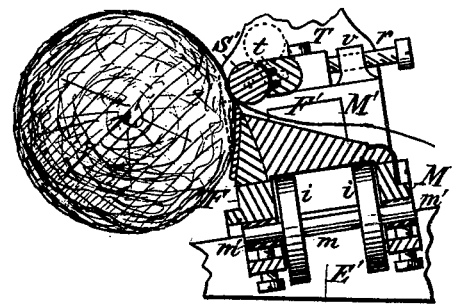
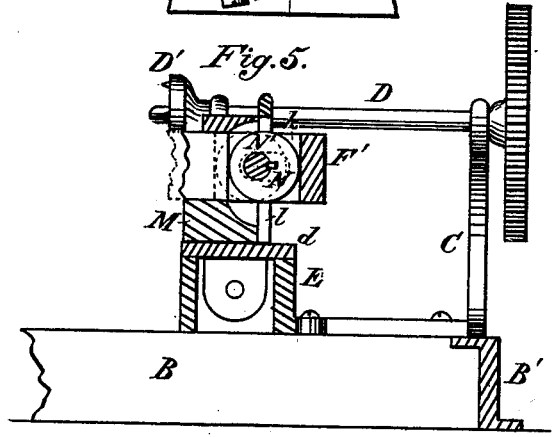
Attest:
F. H. Schott
M. T. E. Chandler
Inventor:
John D. McEachren
by J. C. Tasker & Co. atty.

UNITED STATES PATENT OFFICE.

JOHN D. McEACHREN, OF GALT, ONTARIO, CANADA.

IMPROVEMENT IN MACHINES FOR CUTTING VENEERS.

Specification forming part of Letters Patent No. 198,404, dated December 18, 1877; application filed November 17, 1877.

*To all whom it may concern:*

Be it known that I, JOHN D. McEACHREN, of the town of Galt, in the county of Waterloo, Province of Ontario, Canada, have invented certain new and useful Improvements in Veneer-Cutting Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of veneer-cutting machines in which the veneer is cut from the log in a continuous sheet, the log revolving upon its center and the cutting-knife advancing upon a line parallel to the radius of the revolving log at a rate equivalent to the thickness of the desired veneer at each revolution; the object being to so improve the machine as to enable it to cut veneers of the greatest thickness required in the art, such as material for barrels, carriage bodies and panels, as well as the thinnest stuff used for veneering, covering walls in place of paper, and many other purposes, with perfectly smooth surfaces, and an entire freedom from checks or shatters of any kind, thus putting in the market a new and better article of manufacture than has hitherto been produced, filling a want long felt by manufacturers, as the veneers free from checks cut heretofore were produced by the use of a pressure-bar or pressure-roll placed opposite the cutting-edge of the knife, and invariably presented surfaces rough and unfitted for anything but the coarsest work, without further manipulation, while those veneers cut upon machines of such a nature as to give them one comparatively smooth surface just as invariably filled the opposite side with checks, which rendered them valueless for any purpose requiring the strength of the wood to be intact.

The invention consists, first, in the use of a reciprocating knife, with a pressure roller or bar bearing against the log nearly parallel with and opposite to, or slightly in advance of the edge of the knife; secondly, in the use of, the reciprocating knife, with the pressure roller or bar, and the mechanism for producing rotation of the log or material being cut into veneers; thirdly, in the mechanism employed in connection with the veneer-cutting knife to produce its reciprocating movement; fourthly, in the means employed for supporting the knife, so as to avoid unnecessary friction of the same during its reciprocations; fifthly, in the means employed for rendering the pressure roller or bar easily and readily removable from its contact with the log and position opposite to the edge of the knife, for the purpose of preventing contact with the latter, and allowing the log to be turned true, preparatory to cutting it into veneers; and it further consists in certain details of construction and combinations, which will be first fully and clearly described, and then specifically claimed.

Figure 2:
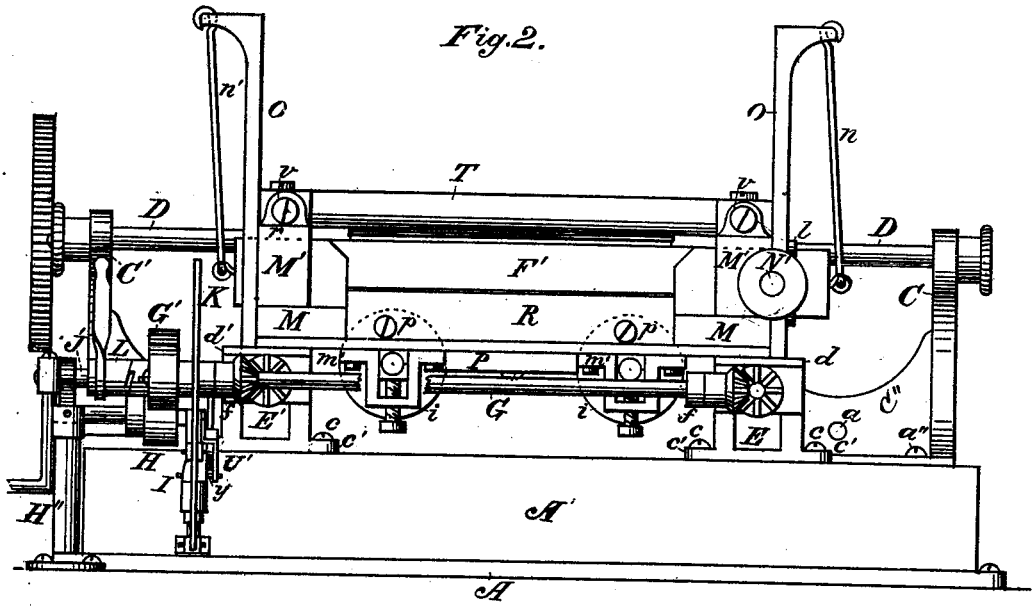

In the accompanying drawings, Figure 1 is a plan, showing the relative position of the different parts of the machine upon a horizontal plane. Fig. 2 presents a side view, showing the rear of the knife-carrying frame and the mechanism employed in feeding it to the log, as well as the vertical relation of the different parts of the machine. Fig. 3 is an end view, showing the inclined position of the knife-carrying frame and the arrangement of frictional devices, by which motion is imparted to the screws which feed forward the knife and frame, as well as the mechanism by which such forward movement is automatically stopped in time to prevent the frame from coming in contact with the log-holding chucks. Fig. 4 is a transverse section of the knife-carrying frame, exhibiting the arrangement of the adjustable carrying-rolls upon which the knife reciprocates, and the method of turning back the pressure-roll to remove it from contact with the knife or the periphery of the log. Fig. 5 is a partial longitudinal section of the knife-carrying frame, showing the position and relative arrangement of the eccentric and its propelling-shaft.

The rectangular bed of this machine, represented in the drawings by the part marked A, should be of metal, in order to insure sufficient strength and rigidity, although wood may be substituted where the work to be done is of such a nature as to not require it, as in cutting short and light veneers for special purposes. This frame is composed of the outer longitudinal pieces or ways A' and A'' and the centrally-placed way B, the three being connected transversely by the end pieces B' and B''. One or more transverse ribs or supports, B''', may be introduced for the purpose of increasing the lateral stiffness of the frame, if its length be such as to make stiffening necessary.

Upon the opposite ends of the ways formed by the central part B and outer part A'' of the frame are placed the two head-blocks C and C', each carrying suitable rotating spindles D and chucks D', between which the log or other material to be cut into veneers is placed. The revolution of these chucks and spindles is accomplished generally through the agency of pinions upon a driving-shaft, which gear into toothed wheels upon the spindles, thus allowing great power to be applied to the purpose of revolving the material if it be found necessary. These spindles are also supplied with devices for giving either the spindle itself or the chuck a forcible endwise movement, so as to force the spurs upon the chucks into the ends of the logs, thus causing the latter to rotate in unison with the spindles.

In order to regulate the position of the spindles with relation to the cutting-knife, so as to cut straight or tapering logs, the head-block C is made transversely adjustable upon the ways A'' and B by means of the adjusting-screw $a$ passing through a lug, $a'$, attached to the way A'', and screwing into the longitudinal rib C'' of the head-block.

It will thus be apparent that, by means of this screw $a$, the position of the head-block C with relation to the cutting-knife and head-block C' may be changed so as to make the machine cut veneers from straight or tapered logs.

In order to admit of its ready adjustment, the head-block C is held to the ways by the screws $a''$ passing through the slots $b$. These screws, when tightened, hold the head-block stationary, but when loosened a little allow the adjusting-screw to move it into the desired position.

Mounted upon the frame, and secured to the parts A and B by screws $c$ passing through lugs $c'$, are the bifurcated inclined ways E and E', upon which rests the knife-carrying frame F. This frame consists of two sliding plates, $d$ and $d'$, which rest and slide upon the ways, and are provided with downwardly-projecting lugs, which enter the bifurcations of the ways, and receive the adjusting-screws $e$ and $e'$, which are provided at their outer ends with bevel-gears, engaging with similar gears upon the shaft G, journaled in the bearings $f$ attached to the ways E and E'. Secured to one end of this shaft is the friction-pulley G'.

Motion is communicated to the pulley G', and through it to the shaft G, by means of an intermediate friction-pulley, H, mounted and revolving upon a vibrating shaft, H'. One end of this shaft is supported by and pivoted in the standard H''. Its opposite end rests upon the toggle I, composed of the jointed parts $g$ and $g'$. The part $g$ has a rearward extension pivoted to the lug $h$, which is secured to the floor, or to a projection from the frame A.

It will be observed that the toggle I, when in an erect position, is self-supporting, and holds the friction-pulley H firmly in contact with the pulleys G' and J; but when thrown back by means of the hand-lever K, which acts upon it through the connecting-bar K', it allows the friction-pulley to drop out of contact with the pulleys G' and J, thus preventing the rotation of the shaft G, and consequently any movement of the cutter-carrying frame F.

The pulley J is placed loosely upon, but may be secured to, the shaft J', so as to rotate with it by means of the clutch L operated by the lever L'. This shaft J is carried by and revolves in brackets $h'$ and $h''$, receiving motion through any suitable positive gearing from the main shaft, which gives motion to the log-carrying spindles, so that when they are connected their movements shall be synchronous; but any slight variation in speed will be compensated by the friction-wheels, although when great changes in the thickness of the veneer to be cut is made it will necessitate a corresponding change in the gear which imparts motion to the shaft J' from the driver.

The clutch L furnishes a ready means of stopping the revolution of the friction-pulleys, and consequently preventing the advance of the cutting-knife, its controlling-lever L', as well as the hand-lever K, which operates the toggle, being adjacent to each other, and in such positions as to be readily manipulated by the operator of the machine while standing at his post of observation.

Resting upon and secured to the sliding plates $d$ and $d'$ is the carrier M, which consists of a rectangular frame, open in the middle for the passage of the carrying-wheels $i$, which support the reciprocating knife-bar. It is further provided with a vertical projection, M', at each end, inclosing a rectangular opening, which forms the guides for the reciprocating knife-bar F. In one end of this knife-bar is formed a mortise, $k$, within which revolves the eccentric N upon the splined shaft N'. This shaft is carried by and revolves in bearings $l$ upon the outer side of one of the projections M', and is rotated by means of any suitable gearing connecting it with the main driving-shaft.

The shaft N' has no longitudinal movement, the knife-bar and eccentric being free to move upon it, the latter being rotated with it at any point in its length, by a key fitted to move in the spline of the shaft.

It will thus be apparent that the knife-bar and knife will have a constantly-reciprocating movement, causing the knife in its passage through the wood to act continually with a drawing cut, thus making the surfaces of the severed veneers perfectly smooth, as well as effecting a great reduction in the power required to cut a specified quantity of veneers over what is necessary in machines as ordinarily constructed.

The supporting-wheels $i$, upon which the knife-bar rests, are fixed to axles $m$, which revolve in adjustable bearings $m'$ attached to the under side of the carrier M, thus enabling their peripheries to be readily adjusted to the line of travel of the under side of the knife-bar. In place of these supporting-rolls, or in connection with them, the perpendicular supports O are attached to the ends of the carrier M, and carry the suspension-rods $n$, pivoted to the knife-bar at each of its ends, thus giving support to the extremities of the knife-bar, while its middle, under the line of cut, is supported by the wheels $i$.

Where the machine is used for cutting short stuff, it is evident the wheels $i$ could be dispensed with, the suspension-rods being found amply sufficient to support the knife-bar in the cut when aided by the plate P, which is attached to the under side of the carrier M by the screws $n'$, thus to a certain extent taking the place of the wheels. A keeper, R, is attached to the carrier M by the screws $p$, and serves to keep the knife-carrier down upon its bearings when the knife is cutting. The adjustable bearings S upon the projections M' carry the roller-supporting bar T. This bar is pivoted at each end in the bearings S, and carries the roller S', which revolves in the concave face of the bar upon pivots at either end.

It will be observed that the peculiar construction of the bar T enables the operator to raise the roller out of contact with the log, when desired, and to place it in position again without changing the adjusting devices, which consist of screws $r$, passing through the lugs $v$, and acting against the rear of the bearings S, which are held down by the screws $x$, passing through slots in the bearings into the projections M'.

It will be obvious that, instead of using the roller, the bar may be solid, with its front edge rounded, which will produce substantially the same result, viz., cutting perfectly solid veneers free from checks, but will increase the friction, and consequently the power required to operate the machine.

If desired, the friction of the roller against the concave side of the bar T, caused by its springing, and therefore impinging, against the bar, may be relieved by inserting one or more friction-rollers, $t$, within recesses in the concave side of the bar. Attached to the outer side of the inclined way E' is a slide, U, having at one end the projection $z$. Pivoted to this slide is a hook-lever, U', so arranged that when the slide is moved toward the log being cut into veneers the hook will catch upon the pin $y$ of the toggle I, and, drawing it backward, allow the friction-pulley H to drop out of contact with the pulleys G' and J, thus arresting the further rotation of the shaft G.

It will, therefore, be apparent that when the machine is in operation, and the knife-carrying frame F has moved forward until the knife is near the center of the log, the end of the sliding plate $d'$ will strike the projection $z$ upon the slide U, and, carrying the slide forward, draw the hook-lever U with it until the hook engages with the pin $y$ and trips the toggle which holds the friction-pulleys in working contact, thus automatically stopping the advance of the knife before it has reached a position dangerous to itself or any part of the mechanism.

It is well known to all turners of wood that, in order to make smooth work and prevent fracturing of the material, they must keep the cutting-edge of their tools as much above a horizontal line passing through the center of the article being turned as possible, and have the tool catch, and as the material is cut away and gets smaller they lower the tool-rest to keep the tool in a proper cutting position. To accomplish this end I use the inclined ways upon which the tool-rest or knife-bar rests and moves toward the center of the log, and, while it is thus advancing horizontally, it is also descending toward the center, thus requiring the tool to be but once adjusted for any size log.

In order to prevent the shaking or fracturing of the sheets of veneer as they are being cut from the log, I use a concave knife having its concave face toward the periphery of the log, the radius of the concave being as great as that of the largest log the machine will cut. This allows the entire thickness of the body of the knife to stand inside of a perpendicular line let fall from its edge, thus bringing the bevel of the knife in a plane nearly at right angles with the radius of the log, instead of forming an obtuse angle with the radius, as is the case where the face of the knife is straight.

It will be apparent that the head-blocks may be made to work on sliding ways, and the knife-frame remain stationary; but I prefer the sliding of the knife-frame toward the log, as it is lighter, and consequently does not need such powerful feeding-gear.

The operation of this machine is simple and easily understood, requiring little knowledge of mechanics and but a short term of practice to enable the attendant to operate it successfully. Many veneer-cutting machines have been constructed embracing a part of the mechanism employed in this, and with the same purpose in view, viz., cutting smooth veneers free from checks; but, from a lack of proper arrangement and combination of the several devices, they have proved unsuccessful in practice, and have generally been abandoned as worthless.

Having thus described my invention, I claim as new, and desire to secure by Letters Patent of the United States, the following:

1. In a veneer-cutting machine, the combination of the reciprocating knife, having a shear or drawing cut, with the pressure-roller, for gaging the thickness and preventing its checking, and imparting a smooth surface to the veneer, substantially as described.

2. In a veneer-cutting machine, the combination of a reciprocating knife, a pressure-roller, spindles D, chucks D', with their driving-gear, for producing rotation of the log to be cut, substantially as specified.

3. In a veneer-cutting machine, the reciprocating knife-bar, supported as described, in combination with the sliding eccentric, for producing such reciprocation, substantially as set forth.

4. In a veneer-cutting machine, the reciprocating knife-carrier, in combination with the wheels $i$, supports $o$, and suspension-rods $n$, for supporting it during its reciprocations, substantially as and for the purpose specified.

5. In a veneer-cutting machine, the combination of a sliding knife-carrying frame with the swinging pressure roller or bar and a reciprocating knife, as set forth.

6. In a veneer-cutting machine, the vertically swinging and horizontally-adjustable pressure bar or roller, in combination with a knife-carrying frame, as set forth.

7. In a veneer-cutting machine, the toggle I, provided with pin $y$, and having the upper and lower parts $g$ and $g'$, in combination with the friction-pulleys H, G', and J, operating-lever K, connecting-bar K', and sliding clutch L, all these parts being for the purpose of operating the feeding-screws by which the knife is carried to the log.

8. The slide U and hook-lever U', in combination with the pin $y$ upon the toggle I, substantially as and for the purpose set forth.

9. In a veneer-cutting machine, the combination of the system of friction-wheels and feeding-screws with their driving-gear of the sliding clutch L and its operating-lever L', as described.

10. In a veneer-cutting machine, the head-block C, made horizontally adjustable, in combination with the reciprocating knife and knife-bar, for the purpose of cutting tapering logs, as set forth.

11. In a veneer-cutting machine, the reciprocating knife-bar, in combination with the supporting-wheels $i$, axles $m$, and vertically-adjustable axle-bearings $m'$, as specified.

12. The combination, in a veneer-cutting machine, of the reciprocating knife-bar, perpendicular supports O, and suspension-rods $n$, substantially as and for the purpose set forth.

13. In a rotary veneer-cutting machine, the vibrating concave knife, with its concave face toward the revolving log, its beveled edge forming a right angle to the radius of the log, in combination with the inclined ways, for gradually lowering the knife as it advances toward the center of the log, substantially as and for the purposes described.

In testimony that I claim the foregoing as my own I hereunto affix my signature in presence of two witnesses.

JOHN D. McEACHREN.

Witnesses:
H. W. SHORT,
F. L. BARNES.